United States Patent [19]

Martin

[11] 4,092,175

[45] May 30, 1978

[54] METHOD OF REMOVING PAPER ADHERED TO A SURFACE

[75] Inventor: James W. Martin, Somerset, N.J.

[73] Assignee: William Zinnsser & Co., Inc., Somerset, N.J.

[21] Appl. No.: 816,266

[22] Filed: Jul. 18, 1977

Related U.S. Application Data

[62] Division of Ser. No. 609,332, Sep. 2, 1975, Pat. No. 4,067,773.

[51] Int. Cl.$^2$ .......................... B08B 7/00; C07G 7/02
[52] U.S. Cl. ........................... 134/42; 134/30; 195/2; 195/63; 252/DIG. 12
[58] Field of Search ................ 195/2, 63, 68; 134/30, 134/40, 38, 42; 252/DIG. 12

[56] References Cited

U.S. PATENT DOCUMENTS

| | | | |
|---|---|---|---|
| 2,607,359 | 8/1952 | Oesting | 134/30 |
| 3,627,688 | 12/1971 | McCarty et al. | 195/63 X |
| 3,629,004 | 12/1971 | Cooper et al. | 134/38 X |
| 3,709,825 | 1/1973 | Chirash et al. | 134/40 X |

*Primary Examiner*—David M. Naff
*Attorney, Agent, or Firm*—Barry Kramer

[57] ABSTRACT

Paper adhered to a surface with a starch-based adhesive is removed by mixing together (1) an enzyme composition containing a carbohydrase or a carbohydrase and a pratease, (2) a liquid composition containing (a) an activator for the enzyme composition, (b) a wetting agent and (c) a solvent for reducing the rate of evaporation of water from the paper, and (3) warm water, applying the resultant aqueous composition to the paper and physically removing the wet paper after the enzyme has degraded the adhesive. Prior to mixing, the enzyme composition is in a sealed moisture-proof package and the liquid composition is in another package.

8 Claims, No Drawings

METHOD OF REMOVING PAPER ADHERED TO A SURFACE

This is a division, of application Ser. No. 609,332, filed Sept. 2, 1975, now U.S. Pat. No. 4,067,773.

BACKGROUND OF THE INVENTION

This invention relates to a method and article of manufacture for removing paper which is adhered to a surface including wallpaper, signs or the like.

Presently, wallpaper generally is attached to a wall by means of a starch-based adhesive such as wheat paste, or the like. Periodically, the wallpaper is removed prior to applying a new wallpaper or a paint coating to the wall. The removal of old wallpaper is a difficult and time consuming job since the paste generally has aged over a period of years and treatment of the old adhesive must pass through the paper prior to reaching the adhesive. At the present time, this is usually accomplished by applying steam through the paper to wet the adhesive and weaken it to the point that the wallpaper can be scraped from the wall. This technique is undesirable from a number of standpoints. First, the technique requires specialized apparatus and is relatively expensive. In addition, when the steam penetrates the wallpaper, it picks up odorous deposits accumulated in the wallpaper and spreads these deposits over other portions of the interior of the building.

It has also been proposed, for example, in U.S. Pat. No. 2,607,359, to provide a composition containing an enzyme, water and a wetting agent and applying it to the exposed surface of the glued paper, which enzyme degrades the adhesive. For example, with a starch-based adhesive, it has been proposed to employ a diastatic type enzyme. Similarly, when the adhesive is a proteinaceous glue, it has been proposed to employ a proteolytic enzyme in the composition. While this procedure has certain advantages over steaming, problems have been encountered with the specific enzyme compositions employed therein. A major problem results from the fact that when the enzymes are mixed with aqueous solutions or contacted with moisture, enzyme degradation is initiated so that it becomes necessary to apply all of the solution to the paper within a relatively short period of time after mixing or contact with moisture, or to employ excessively large concentration of enzyme to assure the presence of the requisite concentration of actual enzyme. Compositions comprising enzymes packaged in aqueous solutions have extremely short shelf lives or required excessive concentrations of expensive enzymes which has prevented their commercial utilization.

It would be highly desirable to provide a means for utilizing an enzyme composition for removing paper adhered to a surface which requires the use of only relatively low concentrations of enzymes, particularly when removing wallpaper adhered with the commonly employed starch-based adhesives. Furthermore, it would be desirable to provide an enzyme-based paper removal composition having a long shelf life so that active paper removal compositions can be prepared and used at the convenience of the practitioner.

SUMMARY OF THE INVENTION

The present invention provides a method and article of manufacture for removing paper adhered to a surface which utilizes a shelf-stable enzyme composition containing either a carbohydrase or a carbohydrase and a protease. The article of manufacture comprises a sealed moisture-proof first package containing the enzyme composition without water and a second package containing a liquid composition comprising a wetting agent, a solvent which extends the time a paper remains wet and an activator for the enzyme composition. The paper is removed by first mixing the contents of a portion of the contents of each package with water, applying the resultant aqueous composition to the paper allowing the enzymes to penetrate the paper and contact the adhesive and physically removing the paper from the surface after the adhesive has lost its adhesive properties.

DESCRIPTION OF SPECIFIC EMBODIMENTS

Surprisingly, it has been found that when employing the method of this invention the amount of enzymes needed to degrade the adhesive is far less than needed with the prior art. Additionally, when employing a carbohydrase and a protease, at any given concentration of enzyme, the time needed to degrade the adhesive is far less when employing the method of this invention as compared to the prior methods. It is believed that one of the reasons that this method is superior to those of the prior art is that the protease attacks the inks commonly employed in wallpaper and, in so doing, opens the pores of the wallpaper to permit the carbohydrase to pass through the wallpaper more easily and to contact the adhesive. The results obtained by this method of this invention are surprising since they are far superior to those obtained by a procedure employing a carbohydrase and a cellulase. One would expect that the cellulase would attack the fibers of the paper to open the pores therein and permit the carbohydrase to pass through the paper to the adhesive. However, it has been found that when employing a cellulase in combination with a carbohydrase, the amount of time needed to degrade the adhesive is far greater than the time required with the method of this invention. This invention is particularly useful for removing paper adhered to a surface with a starch-based adhesive such as wheat paste.

The article of manufacture of this invention provides a means for packaging the compositions used in the method of this invention so that they have a long shelf life. Furthermore, the article of manufacture of this invention provides a convenient means for preparing the compositions in the proper proportions so that they can be used in the method of this invention quickly and easily. The enzyme component is packaged in a moisture-proof container such as a sealed aluminum foil container or in a water-soluble film container, which, in turn, is packaged in a sealed foil container. Since the wetting agents and solvent employed are liquids, they are conveniently packaged in a container such as a glass or plastic bottle. In addition, the activator for the enzyme is packaged with the solvent and wetting agent, rather than with the enzyme. The relative sizes of the two packages merely depend upon the amount of paper for which the enzyme and liquid compositions are to be used for removal. For example, in an average room of 12 by 15 feet, the amount of enzymes employed is between about 10 and 30 grams, usually about 15 grams, while the amount of liquid composition can comprise between about 15 and about 30 fluid ounces. The combination of the enzyme and liquid composition then are mixed with about 2 gallons of hot water to form the composition which is to be used in the method of this invention. The enzyme component is packaged free of water or activator so that it retains substantially all of its activity until desired use. The enzyme can be packaged as a powder, tablet or as a slurry in a liquid which does not reduce its activity. Representative suitable liquids for forming a slurry are the surfactants and wetting agents employed in this invention.

The particular carbohydrase employed in this invention is not critical since starch can be decomposed by diastatic or pentosanasic-hexosanasic enzymes. The source of the enzyme is not of critical importance and any of the commercially available materials may be employed herein. In general, the enzymatic materials are obtained by the fermentation of various mature seed spores or bacteria on a suitable culture medium. Classic methods for the propagation of these spores or bacteria and the extraction of the enzymatic material are outlined in microbiological textbooks and in U.S. Pat. No. 1,660,458, issued Feb. 28, 1928; U.S. Pat. No. 1,421,613, issued July 4, 1922, etc. Representative suitable carbohydrases are $\alpha$-amylase, $\beta$-amylase, glucoamylase, amylo-1-6-$\alpha$-glucosidase or the like. Similarly, the source of the protease is not important to the method of this invention. Suitable proteases include pepsin, trypsin, chymotrypsin, bacteria alkali protease and commercially available enzymatic materials such as those offered by Rohm and Haas under the tradenames Rhozyme A-4, Rhozyme J-25, and the like. Enzymatic materials are commercially available with or without diluents such as kaolin, salt or other inert materials. Though food grade enzyme products can be used, the present invention can be carried out more economically when technical grade enzymes are employed. The enzyme component used in the present invention can include any inert diluent for example, a suspending agent, which does not deactivate the active enzyme component. Representative suitable diluents include diatomaceous earth, kaolin clay, salt, silica talc, hydrous magnesium, aluminum silicates and their organic derivatives.

The liquid component comprises a wetting agent, a solvent for extending the time of wetting of the paper and an activator for the enzyme. In addition, this liquid composition can contain other diluents or solvents such as alcohols, resins, or glycols. Any anionic, cationic or nonionic wetting agent can be employed so long as it does not deactivate or prevent the enzyme from attacking the adhesive. Generally, it is preferred to employ the nonionic enzymes since it has been found that improved results are obtained therewith in the sense that shorter time periods are required to degrade the adhesive under a given set of operating conditions. Representative suitable nonionic wetting agents include ethoxylated alkylphenols and alkanols such as ethoxylated nonyl phenol, ethoxylated octyl phenol and ethoxylated tridecyl alcohol; polyoxyethylene fatty alcohol ethers such as polyoxyethylene laurel ether, polyoxyethylene stearyl ether or the like. Representative suitable cationic and anionic wetting agents include sodium alkaryl sulfonates such as sodium dodecylbenzene sulfonate, sodium dodecylnaphthalane sulfonate, sodium salt of lauryl naphthyl ether, alkali salts of fatty acids, mixtures thereof, or the like.

In order to exend the time that the paper remains wet after applying the aqueous solution, solvents are employed which inhibit water evaporation from the paper. Representative suitable solvents or compounds include glycol ethers such as ethylene glycol monobutyl ether, diethylene glycol monobutyl ether, triethylene glycol monoethyl ether, diethylene glycol monoethyl ether, propylene glycol monomethyl ether and dipropylene glycol monomethyl ether; glycols such as glycerine, alcohols such as isopropyl, ethanol, mixtures thereof, or the like. It is preferred to employ the diethylene glycol monoethyl ether or the dipropylene glycol monomethyl ether since it has been found that improved wetting is obtained therewith as well as the fact that they are relatively nonflammable and less toxic than other glycol ethers or alcohols.

For purposes of the present invention, the weight ratio of carbohydrase to protease should be between about 1:1 to 100:1, preferably between about 2:1 and 5:1 in order to promote enzyme penetration through the paper and to degrade the adhesive.

The relative proportions of the wetting agent and the solvent are such to promote penetration of the water through the paper with the wetting agent and to maintain the paper wet for an extended period of time with the solvent. Generally, it has been found that the volume ratio of wetting agent to solvent should be maintained between 5 and 10 to 1, preferably between 1 and 2 to 1 in order to achieve the most desirable results. The mixture of solvent and wetting agent is employed in amounts of between about 10 and about 50, preferably between about 20 and about 30 volume percent, based upon the volume of water employed.

Any known enzyme activating agent can be employed with the solvent-wetting agent composition including a source of calcium ion such as calcium sulfate calcium acetate, calcium formate or a source of chloride ion such as sodium chloride, calcium chloride or the like. The enzyme activator is employed in a concentration of between about 10 and about 20 weight percent based upon the total weight of the enzyme employed.

The final paper-removing composition is formed by mixing the contents of both packages with water at a temperature from about room temperature and about 180° F., preferably between about 130° and about 145° F. It has been found that the aqueous enzyme solutions comprising a carbohydrase and a protease and prepared in accordance with this invention are active over extended periods of up to about 8 hours when the solution is kept at about 140° F. This is a vast improvement over the compositions employed in the prior art and equivalent to a loss of only about 10 to 20% enzyme activity at room temperature when the aqueous composition is left to stand overnight.

The containers for the enzyme and liquid wetting agent are packaged so that they can be retained together to afford convenience when it is desired to use their contents. For example, the bottle containing the liquid and the moisture proof package containing the enzyme can be housed in a third package. Alternatively, the moisture proof package for the enzyme can be formed of a metal foil such as aluminum foil which is provided with a hole having a size so that it can be fit over the neck of the bottle containing the liquid and be retained over a shoulder of the neck by means of a screw-on cap for the bottle.

The following Examples illustrate the present invention and are not intended to limit the same. Unless otherwise stated, proportions of the ingredients will be by weight.

EXAMPLE I

This example illustrates the superior results obtained in removing paper adhered to a surface with wheat paste when employing an enzyme composition including a carbohydrase and a protease.

A liquid wetting composition was prepared by mixing the components set forth in Table I with each of the six compositions set forth in Table II.

Table 1

| | |
|---|---|
| Ethylene glycol monobutyl ether | 3 oz. |
| Nonionic Wetting Agent (Polytergent SL-42-Olin) | 3 oz. |
| Calcium Chloride | 2 gm. |
| Water-Qs | 22 oz. |

Table II

| Composition | Amylase, g. | Pepsin, g. |
|---|---|---|
| 1 | 18 | 1.8 |
| 2 | 18 | 3.6 |
| 3 | 18 | 9.0 |
| 4 | 18 | 18.0 |
| 5 | 18 | 0 |
| 6 | 0 | 0 |

Paper removal solutions were made by mixing each of the enzyme compositions in Table II with the composition of Table I and 2 gallons of water at a temperature of 140° F. In addition, separate solutions were made with standard water, water adjusted to a pH of 8.5 with ammonia and water adjusted to a pH of 6.0 with acetic acid (vinegar).

Swatches of wallpaper printed with ink containing alpha-protein were pasted to glass slides using wheat paste and aged at 105° F. for four months. These slides were used in testing each of the solutions. It was found that the best results were obtained with the standard water solutions as compared with the alkaline or acidic water solutions.

In each case, the hot aqueous solution was applied with a brush to the exposed surface of the paper and allowed to remain thereon for about 15 minutes. Thereafter, the paper was lifted at its edge to remove it from the glass slide. The effectiveness of the individual compositions was determined by observing the proportion of paper that remained on the slide after the paper was lifted. In each instance, the enzyme composition containing pepsin and amylase was superior to the enzyme composition containing amylase alone or the composition containing no enzyme. The best results were obtained with the No. 2 enzyme composition.

EXAMPLE II

This example illustrates the superior results in removing paper adhered to a surface with wheat paste when employing an enzyme composition including a carbohydrase and a protease.

Solutions were made from the compositions set forth in Table I and each of the enzyme compositions set forth below in Table III.

Table III

| Composition | Amylase, g. | 2nd. Enzyme, g. |
|---|---|---|
| 7 | 0 | 0 |
| 8 | 18 | 0 |
| 9 | 18 | 4.5 Bacterial Protease BPN-1.5 (Novo Enzyme Corporation) pH 7, active |
| 10 | 18 | 4.5 Bacterial Protease, Esperase (Nova Enzyme Corporation) pH 11 active |
| 11 | 18 | 4.5 Cellulase |
| 12 | 18 | 4.5 Bacterial Protease, Alcalase (Nova Enzyme Corp.) pH 9 active |

Table III-continued

| Composition | Amylase, g. | 2nd. Enzyme, g. |
|---|---|---|
| 13 | 18 | 4.5 Pepsin |

Solutions of each of the enzyme compositions were prepared by mixing the compositions of Table I and each of the enzyme compositions of Table II with 2 gallons of hot water at a temperature of about 140° F. Each of the resultant solutions was tested by being applied to wallpaper which had been pasted to glass slides with wheat paste and aged at 105° F. for four months. These solutions were applied to the wallpaper and allowed to penetrate for about 5 minutes. Thereafter, the wallpaper was lifted from the glass slide by its edge. The compositions were evaluated by observing the amount of wallpaper left after lifting for each of the compositions. It was found that compositions 12 and 13 produced far superior results than with the other compositions 7 – 11, with composition No. 12 being the most effective.

Some of the solutions prepared in accordance with this example also were tested by being filtered through printed wallpaper and then tested for activity by being admixed with a wheat paste solution and measuring the viscosity of the mixture one hour after mixing. The wheat paste solution comprised 100 grams of 10% wheat paste. In each instance, one cubic centimeter of the filtrate was added to 100 grams of the wheat paste solution.

The results are set forth in Table IV.

Table IV

| Filtrate Composition | Viscosity of Paste 1 Hour After Mixing, cps. |
|---|---|
| 8 | 5000 cps. |
| 12 | 340 cps. |
| 13 | 440 cps. |
| 12 (Unfiltered) | 100 cps. |

As shown in Table IV, the enzyme composition employed in the present invention is superior to α-amylase alone or amylase and a second enzyme which is not a bacteria alkaline protease of pH 9.0 activity or pepsin. Surprisingly, the composition of this invention are more effective than an enzyme composition containing a cellulase.

What is claimed is:

1. The method of removing paper adhered to a surface with a starch-based adhesive which comprises admixing (1) an enzyme composition consisting essentially of a mixture of a carbohydrase and a protease, (2) a liquid composition comprising (a) a calcium salt as an activator for said enzyme composition, (b) a surfactant as a wetting agent and (c) a solvent for reducing the rate of evaporation of water from paper, said solvent being selected from the group consisting of diethylene glycol monomethyl ether, dipropylene glycol monomethyl ether and mixtures thereof, said solvent and wetting agent being essentially inert to said enzyme composition and (3) warm water at a temperature from 100° F. to 160° F. in a proportion of between about 0.1 and 1 ounces of the enzyme composition per gallon of water and between about 0.01 and 0.1 ounces of the enzyme composition per fluid ounce of the liquid composition, applying the resultant aqueous composition to the paper, and physically removing the wet paper after the enzyme has degraded the adhesive properties of the adhesive.

2. The method of claim 1 wherein the enzyme composition consists essentially of amylase and a bacteria alkaline protease of pH 9.0 activity.

3. The method of claim 1 wherein the enzyme composition consists essentially of amylase and pepsin.

4. The method of claim 1 wherein the wetting agent is a nonionic surfactant.

5. The method of claim 1 wherein the wetting agent is an anionic surfactant.

6. The method of claim 1 wherein the wetting agent is a cationic surfactant.

7. The method of claim 2 wherein the wetting agent is a nonionic surfactant.

8. The method of claim 3 wherein the wetting agent is a nonionic surfactant.

* * * * *